A. GLEBE.
MANUFACTURE OF JOINTLESS RINGS.
APPLICATION FILED MAR. 8, 1911.

1,038,346.

Patented Sept. 10, 1912.

Witnesses:

Inventor:
August Glebe.

COLUMBIA PLANOGRAPH CO., WASHINGTON, D. C.

UNITED STATES PATENT OFFICE.

AUGUST GLEBE, OF PFORZHEIM, GERMANY.

MANUFACTURE OF JOINTLESS RINGS.

1,038,346.   Specification of Letters Patent.   Patented Sept. 10, 1912.

Application filed March 8, 1911. Serial No. 613,188.

*To all whom it may concern:*

Be it known that I, AUGUST GLEBE, a subject of the German Emperor, and resident of Pforzheim, Germany, have invented certain new and useful Improvements in the Manufacture of Jointless Rings, of which the following is a specification.

Jointless rings, which are made of sections of rolled seamless cylindrical bodies, can of course only be made of uniform thickness and cannot on the outside be provided with any plastic decoration, since the pressure on the inner side, which is necessary therefor, can not be exerted. Decorative rings were therefore pressed as flat strips and soldered at their smooth ends. The soldering joint remains always visible owing to its color; it lies opposite to the decoration on the inner side of the hand, where the rings are narrower but also exposed to frequent pressure. Owing to its brittleness, the soldered joint often breaks. The difference in the cross section could also be obtained by making the whole ring of the thickness of the thickest point and filing the remaining circumference off, which necessitates work and loss of material. Reliefs on the outside were only obtained by making the inside concave, for which purpose a separate process and tool were required, and even then the thickness of the metal did not suffice for certain reliefs. Attempts to provide jointless rings with reliefs by shifting the same on a thorn, were unsuccessful, because a soft thorn, which was not thicker than the width of the ring, was bent, and a hard one broken off by the pressure exerted thereon.

The present invention, which is shown on the accompanying drawing in its different steps of being put into practice, shows means by which the metal thickness of the circumference can be made so different that on the one hand the filing-off is omitted and on the other hand the larger thickness exists at the point where it is required for the decoration, said means allowing further to mount the decoration on a jointless ring and on as large a part of its circumference as was hitherto possible on flat rings only which were soldered after pressing.

Figures 1 to 6 show the different steps of manufacture of a ring with different size of cross section, while Figs. 7 to 11 represent the different steps of pressing the decoration on the thickest ring part with the aid of two different devices.

Figure 1:
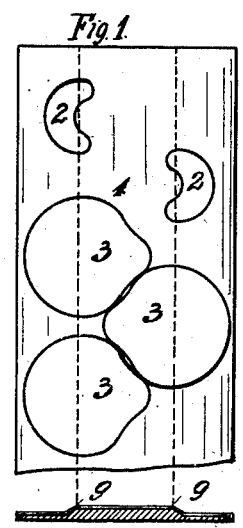
Figure 2:
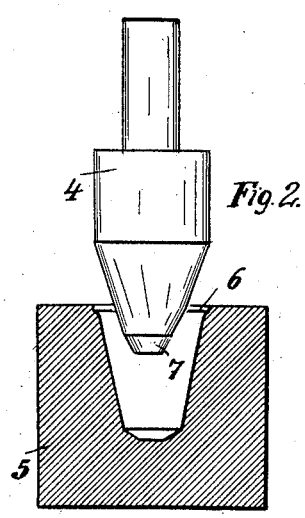
Figure 3:
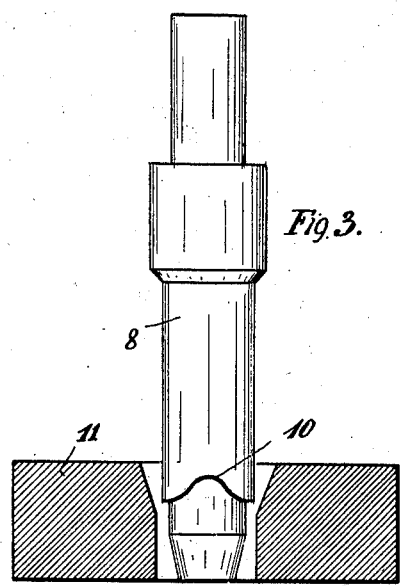
Figure 4:
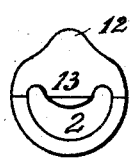
Figure 5:
Figure 6:
Figure 6:
Figure 8:
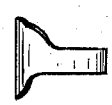
Figure 8:
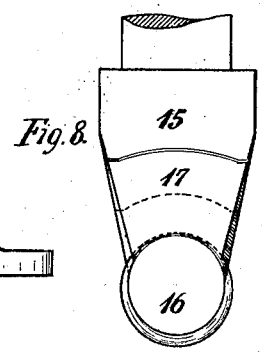

A strip of sheet metal 1 (Fig. 1) is by means of a figured roll so shaped that it receives in its middle between the lines 9—9 a larger thickness than on its sides (see cross section below Fig. 1). From the strip 1 first by punches the openings 2 are punched and then the pieces 3 are punched out (Fig. 4). For the purpose of punching the openings 2 as well as the pieces 3 two punches always work at the same time, one at the left and the other at the right side of the strip. The upper part of said pieces 3 with the projections 12 and 13 above the horizontal line (Fig. 4), which corresponds to the line 9—9 in Fig. 1, is of larger, and the lower part of smaller, metal thickness. The flat piece 3 is now placed in a matrix 5 (Fig. 2) in such a way that the outer projection 12 lies on the right in the recess 6 at the edge of the cavity, while the inner projection 13 lies toward the punch 4 and upon the descent of the punch rests tightly upon the incline 7 at the lower end of the same. The descending punch imparts now to the flat ring piece 3 a conical shape (Fig. 5), the broader and thicker part of the same lying now at the upper side of the conical ring. Thereupon, the ring is, with the narrower opening at the top, placed in the drawing-appliance 11 (Fig. 3), of which the punch 8 is shaped at 10 corresponding to the shape of the ring, while it moves as much eccentric within the bed 11 as is necessary to suit the different thickness of the ring walls. By the ring being forced through the lower cylindrical opening of the bed 11, it receives the cylindrical form shown in Fig. 6, the steps 9—9 having then also disappeared by the two punching operations, so that the outer and inner ring circumferences form two eccentric circles. The broader part of the ring has now the required larger metal thickness.

Figure 9:
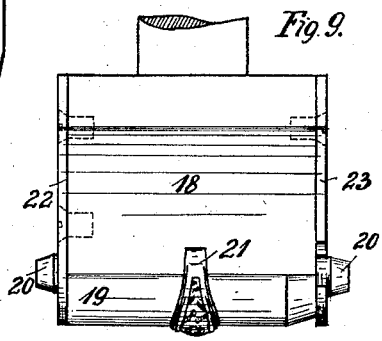
Figure 7:
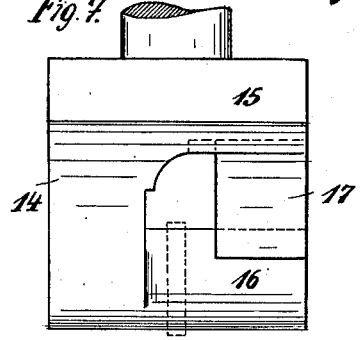
Figure 10:
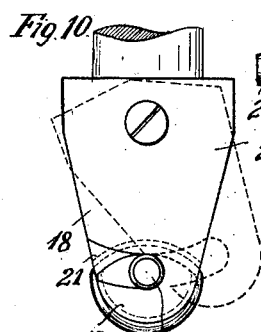
Figure 11:
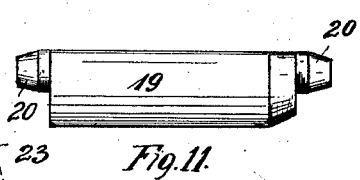

One of the two apparatuses shown in Figs. 7 to 11, serves for pressing the decoration on. Fig. 7 shows one of the same in a front view, and Fig. 8 in a side view. The body 14 has an upper jaw 15 and a lower round thorn 16 which is parallel thereto. The distance between jaw 15 and thorn 16 is somewhat decreased toward the inside. The templet 17 is after mounting of the ring on the thorn so clamped between jaw and thorn by a slight blow that the free end of the thorn finds a support thereon, which prevents it from breaking off. After each pressure, the templet 17 must be removed and after mounting of another ring again be replaced. The swage belonging thereto is substantially the same as those hitherto used. The device above described is, however, only suitable for pressing decorations on, which assume not more than ¼ of the ring circumference, because else the lateral end would receive too steep a position in the swage. For broader decorations the device shown in Figs. 9, 10 and 11 is employed. The first two show the bung 18 with press-thorn 19 in a front and side view, while the last shows the press-thorn alone, which can be entirely detached from the bung. The cross section of said thorn is not symmetric at the top and bottom, it being flatter at the top, while also the bottom end corresponds to a ring of larger diameter. The lower end of the bung 18 fits exactly the top end of the thorn, so that both lie flat upon each other. Besides, the bung 18 has a lower ringlike groove 21 for the reception of the upper part of the ring, which is placed on the thorn. The thorn 19 which on both ends is provided with pins 20 lies with one of the latter in the fixed jaw 22, while the other pin is locked in position by the cut-away part of the movable jaw 23. The thorn 19 lies at both sides of the groove 21 upon the bung 18, where it receives pressure only, so that a breaking of same is practically impossible. After each operation, the jaw 23 is brought into the dotted position (Fig. 10), the thorn 19 lowered, and the ring removed. The ring is then shifted on a round thorn and by beating with a wooden hammer brought into its final shape. The cross section of the thorn 19 is changed according to the width of ring and the desired size of decoration.

I claim:

In the manufacture of jointless metal rings, forming a sheet metal strip of larger thickness in its middle than on its sides, punching flat ring pieces each having an outer and an inner projection out of said metal strip, the thicker part of each flat ring piece lying symmetrically on that side containing the outer projection, stamping a conical ring from said flat ring piece, and finally a cylindrical ring from said conical ring.

In testimony whereof I have hereunto set my hand in the presence of two subscribing witnesses.

AUGUST GLEBE.

Witnesses:
 A. O. TITTMANN,
 S. H. SHANK.

Copies of this patent may be obtained for five cents each, by addressing the "Commissioner of Patents, Washington, D. C."